UNITED STATES PATENT OFFICE.

HENRY R. RANDALL, OF BROOKLYN, NEW YORK.

TREATMENT OF SILK FIBER.

SPECIFICATION forming part of Letters Patent No. 354,223, dated December 14, 1886.

Application filed April 8, 1886. Serial No. 198,273. (No specimens.)

*To all whom it may concern:*

Be it known that I, HENRY R. RANDALL, a citizen of the United States, residing at Brooklyn, in the county of Kings and State of New York, have invented new and useful Improvements in Processes for the Treatment of Silk Fiber, Raw and Waste Silk, and Cocoons, of which the following is a specification.

My invention relates to the treatment of silk fiber, but more especially to raw and waste silk, and the purpose thereof is to so treat the fiber that it may be readily reeled without necessarily removing the gummy matter therefrom.

My invention is also applicable to the treatment of cocoons without change; and it consists in the novel process or method of treatment, hereinafter fully set forth, and definitely pointed out in the claims.

My present invention is an improvement upon the invention set forth in Letters Patent of the United States granted to me the 9th of February, 1886, and numbered 335,958.

In carrying out my invention I make use of a solution of commercial acetic acid in water, in the proportion of about one to three ounces of the acid to a gallon of water; or I may, however, combine with the acetic acid a small proportion of sulphuric acid, the substantial proportions being one-quarter of an ounce of sulphuric acid and one ounce of acetic acid to a gallon of water. This formula may be used with equally beneficial results.

In applying my process to the treatment of silk fiber, raw or waste silk, or cocoons I place the fiber to be treated in the solution specified, the latter being raised to a temperature of about 120° to 130° Fahrenheit. The solution is retained at or about this temperature for several hours, being never allowed to rise to the boiling-point, and after the treatment has progressed to the requisite stage, which can readily be determined by an examination of the fiber, the latter is removed, washed, dried, and then subjected to the ordinary processes.

I may use sulphuric acid in place of acetic acid alone, and the results are not dissimilar, save in the degree of perfection to which the result is carried.

The temperature of the solution to which the silk fiber, raw or waste silk, or cocoons are subjected may vary considerably from the degree mentioned, the sole limitation being that the solution shall not be allowed to rise to or near the boiling-point.

The proportions of the acetic acid to the gallon of water, or of the acetic and sulphuric acids thereto, may be considerably varied without departing from my invention.

It is not my purpose in this process to remove the gum from the fiber, but to disintegrate it, so that it can be reeled without difculty. Heretofore various methods have been employed for this purpose, among which is that of Ginnon, who uses a steep of soda-lye at 212° Fahrenheit, and follows it with a bath of dilute sulphuric acid; also, the method invented by Palangie and Bédu, who use a bromine solution, and then a bath of tartaric or citric acid. These processes differ from mine in the fact that they contemplate the removal of the gum as the preliminary step. Moreover, the use of sulphuric acid in the one and of tartaric or citric acid in the other, after the gum is removed, injures the fiber; and, moreover, the effect produced is as different as the difference between the agents used. I employ commercial acetic acid, which usually contains one one thousandth part, by weight, of sulphuric acid. This acid (acetic) enters into my bath in the proportion of substantially four parts to one part of sulphuric acid dilute. The fiber, without removing the gum, is steeped in this for a suitable period at a temperature which is never allowed to rise to the boiling-point.

Having thus described my invention, what I claim is—

1. In the treatment of silk fiber, waste and raw silk, and cocoons, the process hereinbefore set forth, consisting in subjecting the same before removing the gum to the action of a solution of acetic acid in water, in the proportions and at the temperature specified.

2. In the treatment of silk fiber, waste and raw silk, and cocoons, the process set forth, the same consisting in subjecting said fiber before removing the gum to the action of a watery solution of acetic acid and sulphuric acid, in substantially the proportions specified, at a temperature below the boiling-point, substantially as described.

In testimony whereof I affix my signature in presence of two witnesses.

HENRY R. RANDALL.

Witnesses:
JAMES L. NORRIS,
JOS. L. COOMBS.